United States Patent
Hallgren et al.

(10) Patent No.: US 12,229,121 B2
(45) Date of Patent: *Feb. 18, 2025

(54) PROPAGATED DELETION OF DATABASE RECORDS AND DERIVED DATA

(71) Applicant: Palantir Technologies Inc., Denver, CA (US)

(72) Inventors: Jeppe Hallgren, Copenhagen (DK); Ammaar Reshi, Palo Alto, CA (US); James Thompson, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,039

(22) Filed: Oct. 12, 2023

(65) Prior Publication Data

US 2024/0037094 A1 Feb. 1, 2024

Related U.S. Application Data

(63) Continuation of application No. 17/208,914, filed on Mar. 22, 2021, now Pat. No. 11,822,542, which is a continuation of application No. 15/990,338, filed on May 25, 2018, now Pat. No. 10,956,406.

(60) Provisional application No. 62/518,421, filed on Jun. 12, 2017.

(51) Int. Cl.
*G06F 16/23* (2019.01)
*G06F 16/24* (2019.01)
*G06F 16/242* (2019.01)
*G06F 16/25* (2019.01)

(52) U.S. Cl.
CPC ...... *G06F 16/2386* (2019.01); *G06F 16/2365* (2019.01); *G06F 16/2433* (2019.01); *G06F 16/254* (2019.01)

(58) Field of Classification Search
None
See application file for complete search history.

(56) References Cited

U.S. PATENT DOCUMENTS

| | | | |
|---|---|---|---|
| 6,134,543 A * | 10/2000 | Witkowski | ........ G06F 16/24553 |
| 6,216,140 B1 | 4/2001 | Kramer | |
| 6,466,951 B1 | 10/2002 | Birkler et al. | |
| 7,013,313 B1 * | 3/2006 | LaRue | .................... G06F 16/27 |

(Continued)

FOREIGN PATENT DOCUMENTS

WO 2013083793 A1 6/2013

OTHER PUBLICATIONS

Official Communication for European Patent Application No. 18175417.7, dated May 17, 2021, 10 pages.

(Continued)

*Primary Examiner* — Son T Hoang
(74) *Attorney, Agent, or Firm* — Duane Morris LLP

(57) ABSTRACT

A method of enabling propagated deletion in a distributed database system comprises receiving a request to delete data in a distributed database system; causing a display of a relevant dataset and a switch between applying propagated deletion or not; receiving a first selection of a subset of records from the relevant dataset using one or more filter functions and a second selection of applying propagated deletion to the subset of records; and applying propagated deletion to the subset of records to generate a new dataset.

20 Claims, 5 Drawing Sheets

(56) References Cited

U.S. PATENT DOCUMENTS

| | | | |
|---|---|---|---|
| 7,437,360 B1* | 10/2008 | Chitre | G06F 16/1774 |
| 9,104,675 B1 | 8/2015 | Clark et al. | |
| 9,921,918 B1 | 3/2018 | Yellapragada et al. | |
| 2003/0076978 A1 | 4/2003 | Eversole et al. | |
| 2005/0015436 A1* | 1/2005 | Singh | G06F 16/278 |
| | | | 707/999.01 |
| 2005/0172296 A1 | 8/2005 | Schleifer et al. | |
| 2005/0203933 A1 | 9/2005 | Chaudhuri et al. | |
| 2006/0036696 A1* | 2/2006 | Maresh | G06F 16/95 |
| 2009/0024633 A1* | 1/2009 | Swanburg | G06F 16/3329 |
| 2009/0043824 A1* | 2/2009 | Claghorn | G06F 16/93 |
| 2009/0327262 A1* | 12/2009 | Grack | G06F 16/93 |
| | | | 707/999.005 |
| 2011/0106770 A1 | 5/2011 | McDonald et al. | |
| 2011/0191672 A1 | 8/2011 | Schödl et al. | |
| 2014/0108346 A1 | 4/2014 | Pinkney et al. | |
| 2016/0147569 A1* | 5/2016 | Cowling | G06F 16/22 |
| 2017/0270283 A1 | 9/2017 | Shiraishi et al. | |
| 2018/0276232 A1* | 9/2018 | Dhanasekaran | G06F 16/25 |

OTHER PUBLICATIONS

Official Communication for European Patent Application No. 18175417.7, dated Feb. 17, 2020, 6 pages.
Current Claims for European Patent Application No. 18175417.7, dated May 17, 2021, 4 pages.
Current Claims for European Patent Application No. 18175417.7, dated Feb. 17, 2020, 4 pages.
European Patent Office, "Search Report" in application No. 18175417.7-1217, dated Aug. 13, 2018, 8 pages.
European Claims in application No. 18175417,7-1217, dated Aug. 2018, 4 pages.

* cited by examiner

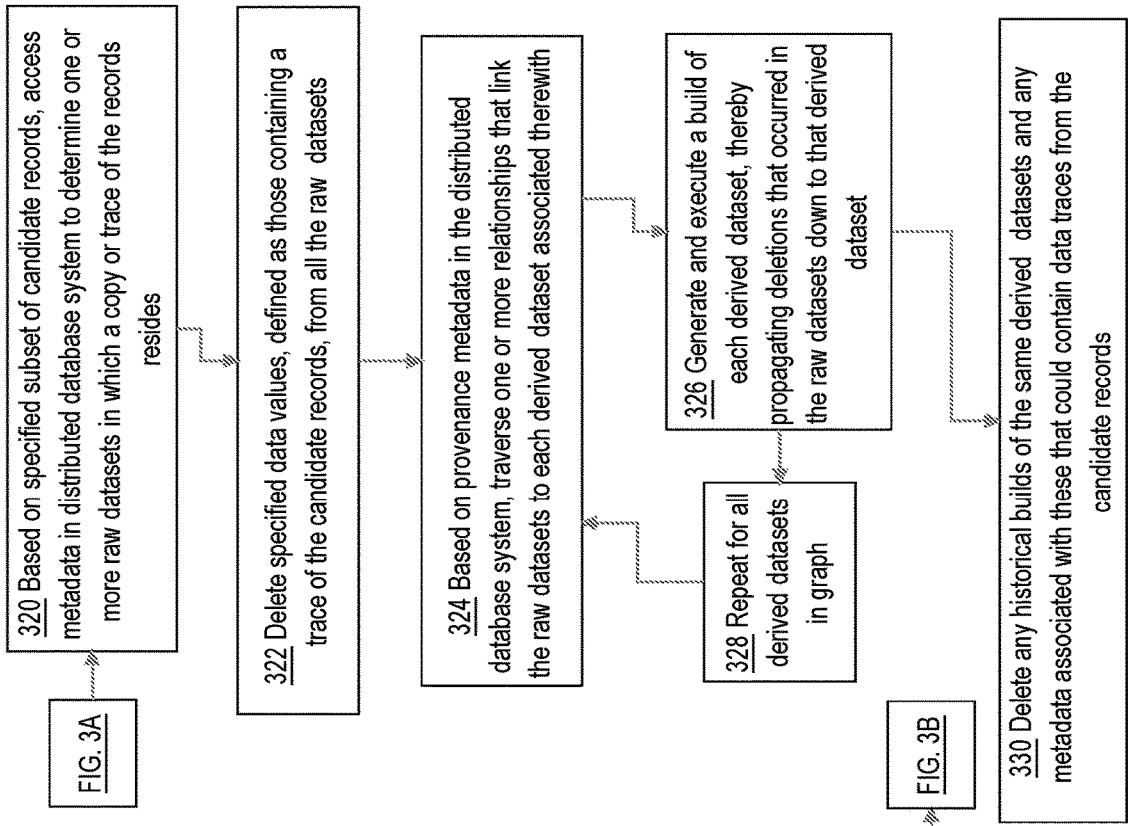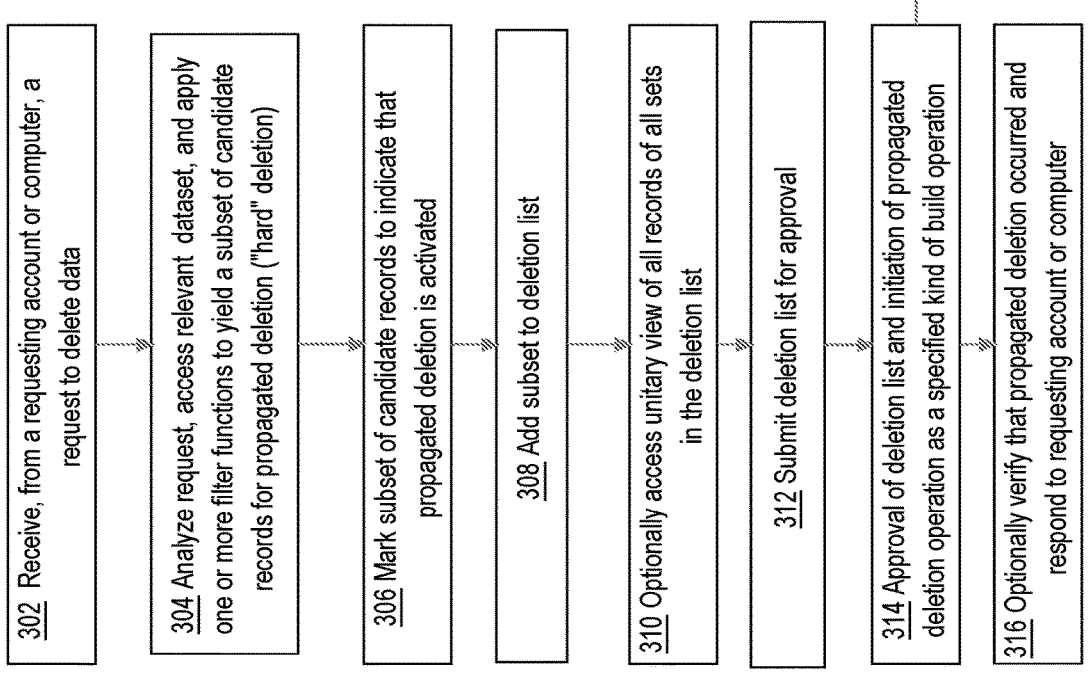

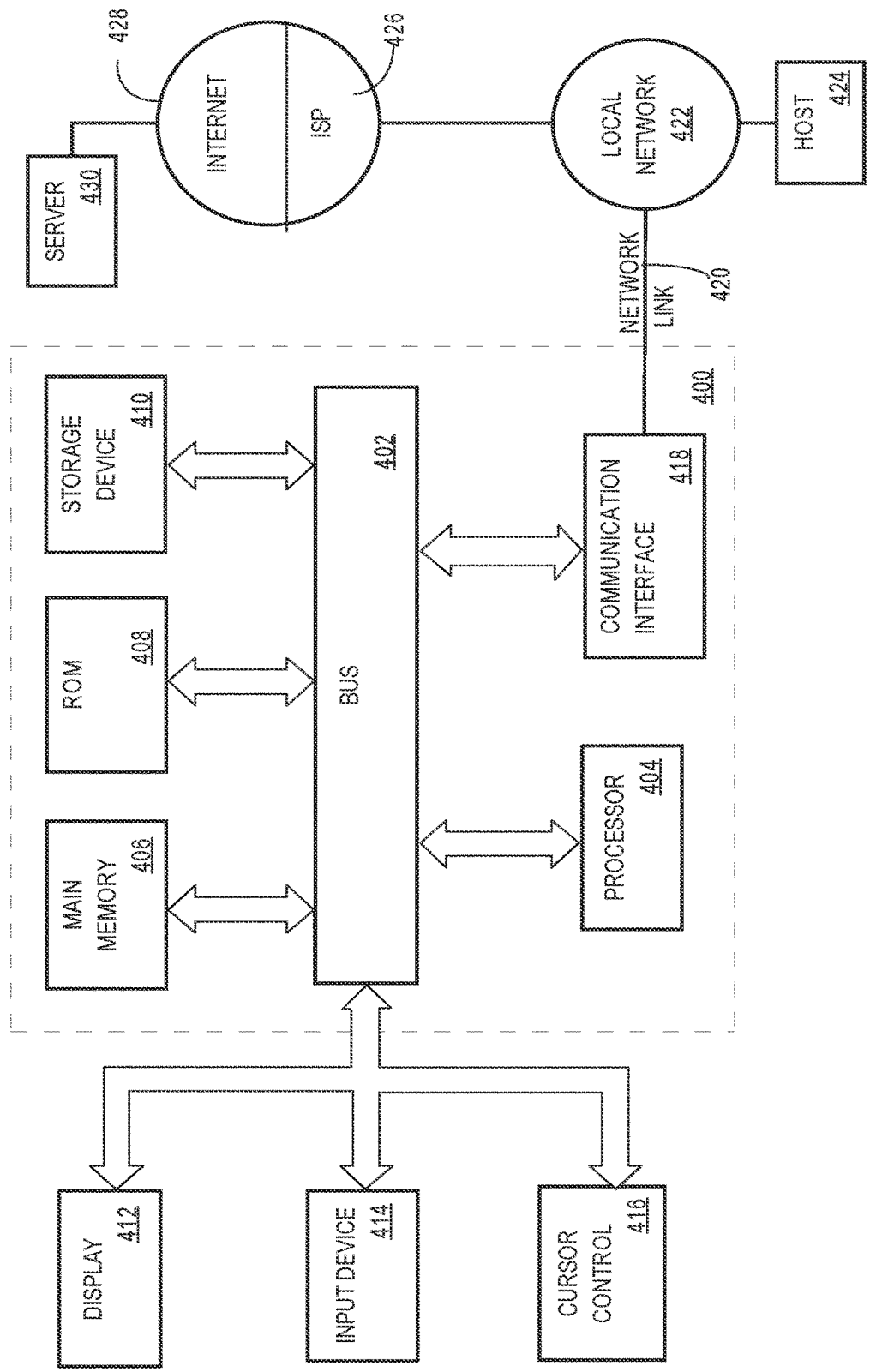

PROPAGATED DELETION OF DATABASE RECORDS AND DERIVED DATA

BENEFIT CLAIM

This application claims the benefit under 35 U.S.C. 120 as a Continuation of U.S. patent application Ser. No. 17/208,914, filed Mar. 22, 2021, which is a Continuation of Ser. No. 15/990,338, filed May 25, 2018, now U.S. Pat. No. 10,956,406, issued Mar. 23, 2021, which claims the benefit under 35 U.S.C. 119(e) of U.S. Provisional Application No. 62/518,421, filed Jun. 12, 2017, the entire contents of each of which are hereby incorporated by reference as if fully set forth herein. Applicant hereby rescinds any disclaimer of claim scope in the parent application(s) or the prosecution history thereof and advises the USPTO that the claims in this application may be broader than any claim in the parent applications.

FIELD OF THE DISCLOSURE

The present disclosure relates to computer-implemented distributed database systems. More specifically, the example embodiment(s) described below relate to computer-implemented techniques for complete deletion of data across replicated or related datasets or data storage systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In many kinds of computer systems, issuing a command to delete a data value, record, file or other dataset does not actually result in destruction, obliteration, or over-writing the dataset. Instead, the dataset is marked as deleted using a flag or other metadata, and an operating system or other access control logic makes the unit unavailable to programs or processes acting at a particular logical level. However, the dataset remains available to administrative systems or other programs or processes that have special access privileges, at least until the dataset is actually overwritten by the normal operation of the computer system.

However, the legal systems of certain jurisdictions require enterprises that store data, in response to certain kinds of requests to delete or remove data, to provide assurance that all copies of the data have been actually erased, overwritten, obliterated, removed or otherwise made totally inaccessible. Compliance with such a requirement is difficult when enterprises use distributed database systems with redundant data storage, fault-tolerant devices, tiered or hierarchical data architectures, or storage of subsets of data in different locations.

Furthermore, some databases observe the property of object immutability, meaning that stored data objects cannot be modified once they are created. These databases have a total data size that is constantly growing and may include many outdated datasets that once had usefulness but later merely occupy space and have limited value. Achieving assured deletion of data in these architectures is a significant challenge.

Thus, there is a need for a computer system that is capable of actual deletion of all copies of data in a distributed system, wherever they are stored.

SUMMARY

The appended claims may serve to summarize the disclosure.

BRIEF DESCRIPTION OF THE DRAWINGS

In the drawings:

FIG. 3A illustrates a method of managing requests to delete data and initiating builds of deleted data.

FIG. 3B illustrates a process of propagated assured deletion of data in a distributed database system.

FIG. 4 is a block diagram that illustrates a computer system upon which an embodiment may be implemented.

DETAILED DESCRIPTION

In the following description, for the purposes of explanation, numerous specific details are set forth to provide a thorough understanding of the present disclosure. It will be apparent, however, that embodiments may be practiced without these specific details. In other instances, well-known structures and devices are shown in block diagram form to avoid unnecessarily obscuring the present disclosure.

Embodiments are described in sections below according to the following outline:
GENERAL OVERVIEW
DISTRIBUTED DATABASE SYSTEM OVERVIEW
EXAMPLE PROCESS OF PROPAGATED ASSURED DATA DELETION
IMPLEMENTATION EXAMPLE—HARDWARE OVERVIEW
IMPLEMENTATION EXAMPLE—BASIC SOFTWARE SYSTEM
EXTENSIONS AND ALTERNATIVES

General Overview

Techniques for propagation of deletion operations among a plurality of related datasets are described herein. In an embodiment, a data processing method comprises, using a distributed database system that is programmed to manage a plurality of different raw datasets and a plurality of derived datasets that have been derived from the raw datasets based on a plurality of derivation relationships that link the raw datasets to the derived datasets: from a first dataset that is stored in the distributed database system, determining a subset of records that are candidates for propagated deletion of specified data values; determining one or more particular raw datasets that contain the subset of records; deleting the specified data values from the particular raw datasets; based on the plurality of derivation relationships and the particular raw datasets, identifying one or more particular derived datasets that have been derived from the particular raw datasets; generating and executing a build of the one or more particular derived datasets to result in creating and storing the one or more particular derived datasets without the specified data values that were deleted from the particular raw datasets; repeating the generating and executing for all derived datasets that have derivation relationships to the particular raw datasets; wherein the method is performed using one or more processors.

Distributed Database System Overview

Figure 1:
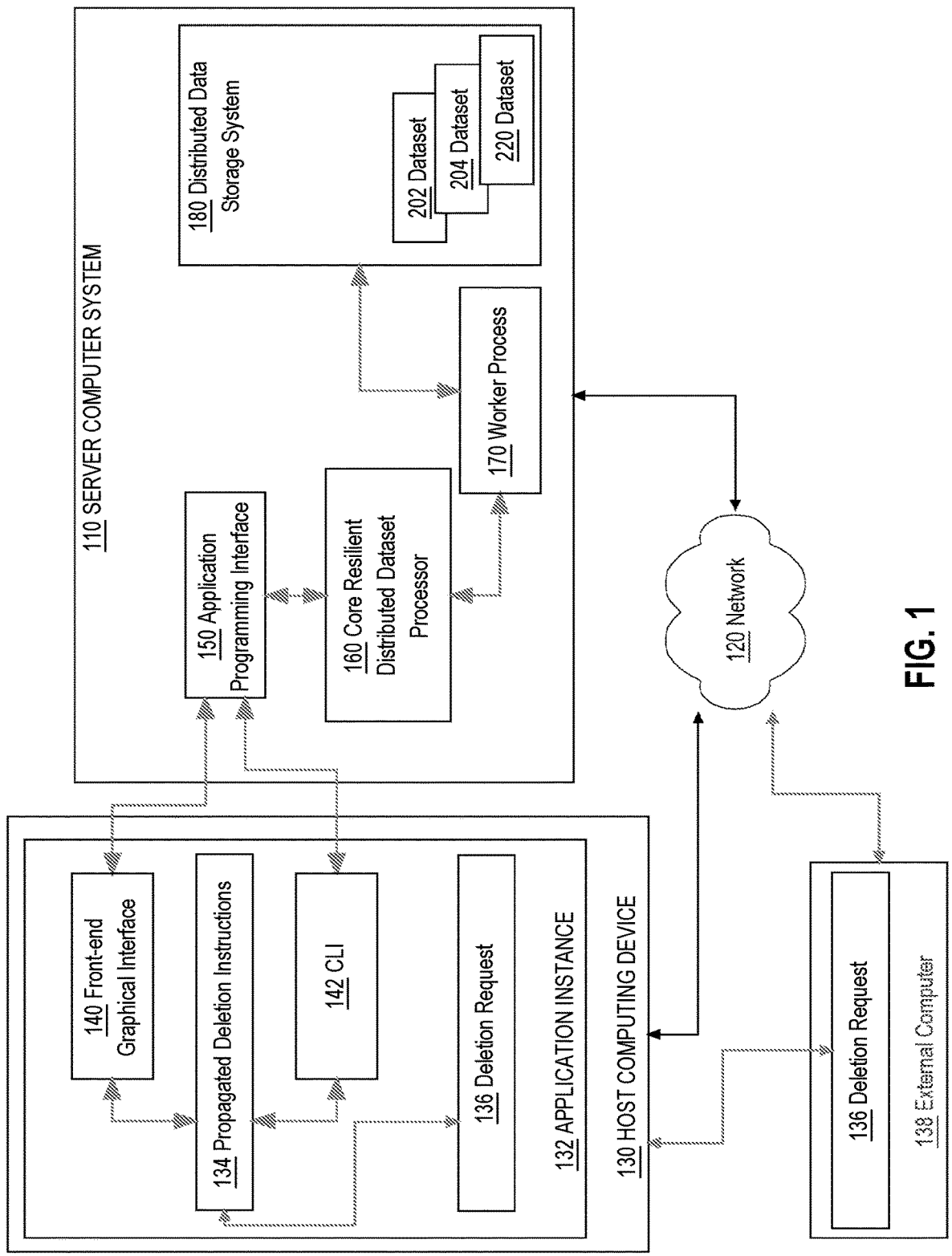
FIG. 1 illustrates a distributed computing system with which embodiments may be implemented.

FIG. 1 illustrates a distributed computing system with which embodiments may be implemented.

In an embodiment, a distributed computing system comprises a server computer ("server") 110 that is coupled via network 120 to a host computing device 130. The distributed computing system can be within one or more data centers, virtual computing facilities or other hosting facilities; other embodiments can be within a networked home, office, or campus.

Network 120 broadly represents a combination of one or more local area networks, wide area networks and internetworks and may include the public internet. The network 120 can connect one or more instances of the host 130, server 110 and an external computer 138 together within the distributed computing environment. Network 120 can be composed of multiple sub-networks that are coupled. For example, the network 120 can be an Internet Protocol Version 4-based and/or an Internet Protocol Version 6-based wired or wireless network or a combination of multiple such networks.

Host computing device 130 broadly represents one or many computers and the number of hosts 130 in the system at a given time may vary in different embodiments and any number may be used. In an embodiment, a host 130 can be a single computing device such as computing device 400 that is described below with respect to FIG. 4. Alternatively, a host can be a single virtual computer instance that executes on a computing device facilitated by a virtualization layer (e.g., a Type 1 or Type 2 hypervisor) interposed between the virtual computer instance and the computing device. The virtualization layer can be a virtual machine monitor such as, for example, virtual machine monitor 530 described below with respect to FIG. 5.

Regardless if a single computing device or a single virtual computer instance, a host 130 can be configured with an operating system (e.g., UNIX, LINUX, MACOS, WINDOWS) as illustrated, for example, by operating system 510 described below with respect to FIG. 5. The operating system of a host 130 can manage low-level aspects of the host's operation including managing execution of processes, memory allocation, file input and output (I/O), and device I/O. Furthermore, the operating system of host 130 may manage presentation systems such as a windowed graphical user interface (GUI) and driving a computer display device such as a flat screen display or CRT. A host 130 may also be configured with a container system (e.g., the DOCKER container system) for running services 134 within containers on the host's operating system.

Services that execute as processes on hosts in the distributed computing environment may be configured using the distributed configuration platform described herein or in application Ser. No. 14/284,959, filed Oct. 4, 2016, the entire contents of which is hereby incorporated by reference as if fully set forth herein.

In an embodiment, host 130 comprises an application instance 132 which allows one or more services to be deployed on host 130 from one or more server computing devices, such as server 110. In an embodiment, application instance 132 comprises propagated deletion instructions 134, a front-end graphical interface 140 or a command-line interface (CLI) 142 that may interoperate to provide the functions that are described further herein. In an embodiment, the front-end interface 140 and CLI 142 are programmed or configured to interact with one or more server-side functional units of server computer 110 as further described. Host computing device 130 also manages one or more deletion requests 136 using processes that are further described in other sections.

A service that application instance 132 facilitates or hosts can be a single instance of a software product or software application installed on at least one of the hosts 130. For example, a service might be a database server instance, a web server instance, or any other instance of a software product or a software application installed on one or more of the hosts 130. Multiple different services may be installed on the hosts 130 including multiple different services on the same host 130. For example, a service may be installed on multiple of the hosts 130 in a distributed, clustered, load balanced, or failover computing arrangement.

In some embodiments, the external computer 138 is associated with an account or user unrelated to the host computing device 130 and/or server computing system 110. For example, host computing device 130 may represent a computer that is associated with an administrative user of an enterprise that also owns and operates the server 110, and external computer 138 may be associated with an independent party.

In an embodiment, server 110 comprises an application programming interface (API) 150, a core resilient distributed dataset (RDD) processor 160, one or more worker processes 170, and a distributed data storage system 180 that stores, for example, datasets 202, 204, 220 as further described. In an embodiment, API 150 is programmed or configured to receive electronic digital messages that define database operations according to a structured query language, parse the messages to determine the operations, and instruct the core RDD processor 160 to execute the operations. Typically, execution of the operations causes instructing one or more worker processes 170 to execute builds of derived datasets, based on raw datasets, with distributed data storage system 180. In this context, a dataset may be termed a raw dataset when data in the dataset has been originally created by a service, or received from a source of data prior to any filtering, joining or other transformation. An example is daily web log data for web services. A dataset may be deemed raw in the sense that a program or transformation operation is not executed to produce versions or transformations of the dataset. In contrast, if a program or process computes a join between datasets A and B, resulting in dataset C, then dataset C is a derived dataset because it is derived from one or more other dataset versions. Joins, filters, calculations resulting in updates of fields or records, or other modifications or transformations to result in derived datasets may be performed in a database system, an Apache Spark system, a data repository that is programmed to perform merges, or any other program or system. In one implementation, API 150 comprises an executable instance of SPARK SQL; the core RDD processor 160 is an executable instance of the SPARK Core; and distributed database system 180 may be an executable instance of a HADOOP file system or a hierarchical distributed database server that implements object immutability.

In general, API 150 provides a flexible and efficient way to indirectly specify rows in a database to be acted upon, with the security of not explicitly transmitting row identifiers across a network connection, but its use is optional and other ways of specifying or identifying rows could be used in other embodiments. For example, as an alternative to an SQL query, a set of explicit row identifiers may be cryptographically hashed using SHA-256 or another hash algorithm and the resulting hash strings may be transmitted in a request to the processor 160. The processor 160 then may command worker process 170 to compare the hash string values to an index of previously prepared hash string values of rows of datasets in the distributed data storage system 180, and then delete rows where a hash match is found. Both the SQL approach and hash approach have the benefit of avoiding transmission of an explicit row identifier, which could be recorded in a log file or otherwise stored in an unanticipated manner.

In an embodiment, each of the propagated deletion instructions 116, API 150, core RDD processor 160, worker process 170, and distributed data storage system 180 comprises a set of one or more pages of main memory, such as RAM, in the host computer 130 or server 110 into which executable instructions have been loaded and which when executed cause each respective computer to perform the functions or operations that are described herein with reference to those functional units. For example, the propagated deletion instructions 116 may comprise a set of pages in RAM that contain instructions which when executed cause performing the hard delete functions that are further described herein.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, each of the instructions also may represent one or more files or projects of source code that are digitally stored in a mass storage device such as non-volatile RAM or disk storage, in the server 110 or a separate repository system, which when compiled or interpreted cause generating executable instructions which when executed cause the server 110 to perform the functions or operations that are described herein with reference to those modules. The specific manner in which programmers or software developers organize and arrange source code for later compilation into an executable, or interpretation into bytecode or the equivalent, for execution by the server 110 or host computing device 130, is not critical.

Example Process of Propagated Deletion of Database Records and Derived Data

Figure 2:
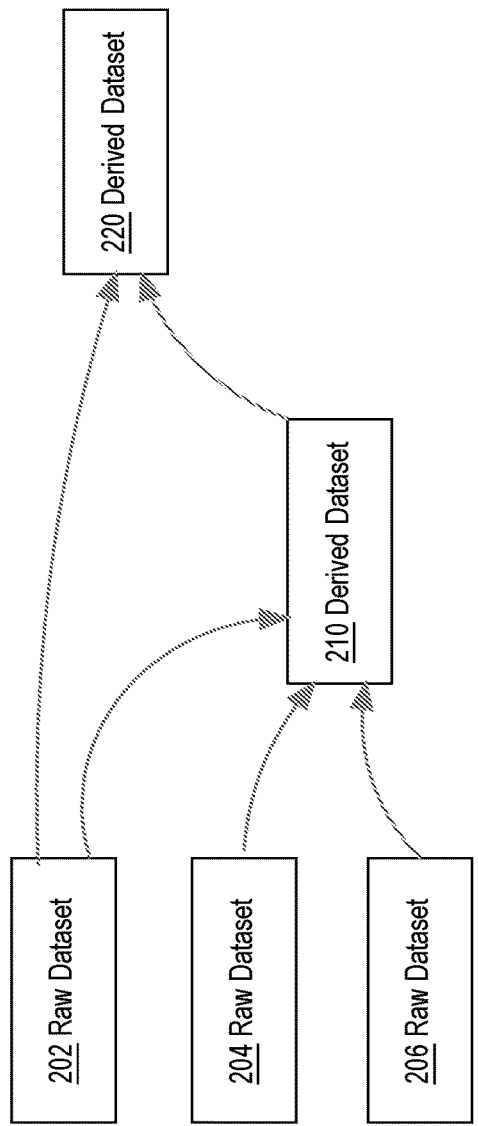
FIG. 2 illustrates an example graph of relationships between three raw datasets and two derived datasets.

FIG. 2 illustrates an example graph of relationships between three raw datasets and two derived datasets.

In the example of FIG. 2, three (3) raw datasets 202, 204, 206 are stored using the distributed database system 180. In one implementation, datasets in FIG. 2 may represent tables of a relational database system and/or materialized views that are derived from the tables. All the datasets 202, 204, 206 contribute, according to a first derivation function or relationship, to a first derived dataset 210 as indicated by arrows connecting the datasets 202, 204, 206 to the first derived dataset 210. Furthermore, a first raw dataset 202 and the first derived dataset 210 contribute, based on a second derivation function or relationship, to a second derived dataset 220. Therefore, the five (5) datasets 202, 204, 206, 210, 220 are arranged in a directed graph in which datasets are nodes and derivation functions or relationships comprise paths. Derivation functions or relationships may specify transformations or access controls such as removal of columns or rows, reordering of columns, or other operations.

FIG. 2 illustrates five (5) datasets in one arrangement of a graph merely to indicate a clear example and not as a requirement or limitation. Other embodiments may include any number of raw datasets and/or derived datasets arranged in graphs of any level of complexity limited only by available memory, storage and/or processing power of the computing instances that are used in a deployment. Furthermore, the graph view of FIG. 2 may represent a visualization, for human convenience, of digitally stored metadata that represents nodes and links of the datasets that are shown. In other words, storing metadata about nodes and links is sufficient to support the traversal or determination of relationships as further described herein, and actual storage of a graphical image is not required.

In an embodiment, the propagated deletion instructions 134 are programmed or configured to cause receiving and processing a deletion request 136, through the front-end graphical interface 140 or CLI 142, and to instruct, message or signal the API 150 with data that is sufficient to define how to obtain or retrieve one or more raw datasets 202, 204 and/or derived datasets 220 using distributed data storage system 180. The propagated deletion instructions 134 are further programmed to cause the API 150 to perform specified update operations on the raw datasets that result in deletion of specified datasets, rows, columns or cells, and to instruct the core RDD processor to initiate one or more build operations that automatically cause propagating the updates and deletions downstream to derived datasets 220 that have the raw datasets 202, 204 as sources.

FIG. 3A illustrates a method of managing requests to delete data and initiating builds of deleted data. FIG. 3B illustrates a process of propagated assured deletion of data in a distributed database system.

Each of FIG. 3A, FIG. 3B and any other flow diagram or process description in this disclosure is intended to represent an algorithm or plan for programming computer programs at the same level of detail that skilled persons in this field use to communicate among themselves about the architecture, process or data flow, arrangement, ordering and content of similar computer programs of similar types. That is, the flow diagrams and process descriptions are presented at a level of detail that skilled persons in this field have determined to be sufficient to communicate between themselves the baseline information that is adequate to permit the coding, completion, testing and deployment of computer programs that will execute and operate to provide the functions that are described herein.

The process of FIG. 3A describes certain data input, selection, display, workflow, approval, and other operations that could be implemented in the system of FIG. 1 but are not required in all embodiments. For example, there is no requirement to use a GUI, or to implement a workflow with approval steps, or other operations that are indicated as optional. Instead, the process of FIG. 3A could be modified to implement only identification of a dataset or subset of records for which propagated deletion is needed, and to signal or command such deletion to start using the steps of FIG. 3B. Or, propagated deletion instructions 134 or a compatible script, cron job or control program may automate a set of deletion operations that are usefully executed on a repetitive basis; for example a script could specify a particular set of data to be deleted every 6 months and submit a deletion request 136 with those parameters using a programmatic call.

Referring FIG. 3A in substance, in block 302, a request to delete data is received from a requesting account or computer. For example, host computing device 130 creates via user input, or a programmatic call from application instance 132 or an external system or program, a deletion request 136 and transmits the deletion request to the propagated deletion instructions. Alternatively, external computer 138 may transmit the deletion request 136 to the host computing instance 130. Transmission may occur via e-mail, messaging systems, or programmatic calls. Creating a deletion request 136 also may be performed using the front-end graphical interface 140, which may be programmed to provide forms, GUI widgets, or other facilities to specify what data is to be deleted. Or, as noted in the preceding paragraph, the deletion request 136 may be received as a programmatic call from a script, control program or other system that operates according to a schedule using specified parameters.

In block 304, the process is programmed to analyze the request, access a relevant dataset, and apply one or more filter functions to yield a subset of candidate records for propagated deletion. Propagated deletion or hard deletion refers, in this disclosure, to automatic computer-implemented processes to delete specified data items from raw datasets, from all derived datasets that are based on the raw datasets, and from all historical or related builds of the derived datasets. Hard deletion of data may mean that the information represented within the data is not physically or electronically recoverable. Accessing a relevant dataset may comprise receiving input at the host computing device 130 that specifies opening or viewing a named dataset that is maintained in distributed data storage system 180. To obtain the view, the front-end interface 140 may transmit a SQL query to the API 150 and receive a result set of records.

Applying filter functions may be performed via user manipulation of GUI widgets, providing keyboard input, and other commands in the front-end graphical interface 140. For example, input may specify adding a first filter that identifies personal information for a specified person and adding a second filter that specifies a date range. Collectively, applying these filters results in forming a subset of candidate records for hard deletion and may also cause displaying a table view or row view of the candidate records.

In block 306, the process is programmed to mark the subset of candidate records to indicate that propagated deletion is activated. In one embodiment, marking records to activate propagated deletion comprises selecting a set of records that are displayed in the GUI of front-end graphical interface 140 using a pointing device, and selecting a GUI switch widget. For example, the display may provide a HARD DELETE GUI widget with an ON and OFF position that can be selected to indicate applying propagated deletion to the selected records.

In block 308, the process is programmed to add the subset to a deletion list. In one embodiment, using front-end graphical interface 140, the subset may be associated with a name or label value and then added to a deletion list consisting of a set of such names or label values. The use of a deletion list provides a way to associate a batch of relatively smaller or discrete propagated deletion requests into a larger job or group that is capable of concurrent review in an approval workflow. Thus, the deletion list acts as a queue or shopping cart of multiple subsets of different candidate records. The deletion list may be maintained at the host computing device 130 and managed by the propagated deletion instructions 134 or in storage of server computer 110.

At block 310, the process is programmed to optionally provide access to a unitary view of all records of all sets in the deletion list. For example, in one embodiment, front-end graphical interface 140 is programmed to enable displaying all records of all subsets that are named, labeled, or otherwise represented in the deletion list. This approach provides a way to rapidly re-check different subsets of records that have been selected and added to the deletion list.

At block 312, the process is programmed to submit the deletion list for approval to another computer, account, or user, as part of a defined workflow for approval of hard deletion operations. The second administrator computer or account may be associated with a person who has authority to approve hard deletion of the records specified in the deletion list. In an embodiment, front-end graphical interface 140 displays a SUBMIT button, icon or widget which, when selected, causes transmitting a message or notification to another computer indicating that the deletion list is ready for review.

In block 314, the process is programmed to receive a message, signal or other indication that the deletion list is approved, and initiation of a propagated deletion operation as a specified kind of build operation. Control may transfer to the process of FIG. 3B to execute these operations. Block 314 may involve, for example, a different administrative account accessing the deletion list from a different computer, obtaining the unitary display of block 310, and selecting a button, icon, or other widget to indicate approval and initiation of propagated deletion operations of the kind described for FIG. 3B.

At block 316, the process is programmed to optionally allow verification that a propagated deletion occurred correctly, and to respond to the requesting account or computer. In an embodiment, the effect of the hard delete operation can be assessed by accessing the database to apply the same filters as before, which now will yield zero results. Furthermore, front-end graphical interface 140 may provide an interface to an e-mail system or other messaging system that allows transmitting an acknowledgment, confirmation, or other message to the external computer 138 if it was the source of the deletion request 136. Alternatively, a programmatic response to a calling process may be provided, if such a process was the source of the deletion request 136. Or an e-mail message may be sent within an organization that includes both the host computing device 130 and the server computer 110 to specify that the deletion completed.

Referring now to FIG. 3B, at block 320 the process is programmed, based on the specified subset of candidate records, to access metadata in the distributed database system to determine one or more raw datasets in which the records reside. For example, if deletion request 136 effectively communicates "DELETE ALL RECORDS OF JANE DOE DATED EARLIER THAN 6 MONTHS AGO," and the process of FIG. 3A results in identifying a count of "36" records that need to be deleted across a plurality of different raw datasets that matched queries in the system, there is a need to identify every raw dataset that contains one of the "36" records. Identification may use label values carried in the records that were identified or other metadata from distributed data storage system 180.

At block 322, the process is programmed to delete the specified records from all the raw datasets that were identified at block 320. In one embodiment, deleting data from raw datasets may involve operations on files that are external to database 180, such as deleting rows in CSV files from which data was imported. In an embodiment, propagated deletion instructions 134 form and transmit one or more SQL queries to API 150 that specify updates to the raw datasets that were identified. The API 150 transforms these queries into instructions to the core RDD processor 160, which instructs the worker process 170 to perform updates to the raw datasets at the distributed data storage system 180. Or, when raw datasets are in an external database source such as a HADOOP (HDFS) store, block 322 can comprise generating and transmitting a programmatic call with sufficient credentials to authenticate or authorize the call, or to log in to the external system, and accomplish a deletion there. In still another alternative, deletion can comprise requesting the worker process 170 to contact an elastic search system to update an index in cases in which data was exported to those systems, as specified in metadata.

In an embodiment, using SPARK SQL, the API 150 and core RDD processor 160 accept arbitrary changes to any number of raw datasets, as specified by requests from clients such as interface 140 or CLI 142. This enables the system to carry out deletions and edits at the dataset level, row level, column level or cell level.

In block 324, the process is programmed, based on provenance metadata that is managed in the distributed database system, to traverse relationships that link the raw datasets to one or more derived datasets, reaching each derived dataset associated with the raw datasets. In some embodiments, the provenance metadata is maintained within a derived dataset. That is, a derived dataset may specify, in metadata, which raw datasets it is based on, so that traversal may comprise searching the metadata or loading successive derived datasets based on name, timestamp or other values until a relationship to a raw dataset is identified. Or the provenance data may be managed in separate metadata tables or files. As an example of its use, once the raw datasets containing the "36" records have been identified, propagated deletion instructions 134 may transmit other SQL queries to the server 110 to retrieve identifying information for all derived datasets that have derivation relationships to the raw datasets.

As a derived dataset is identified via the relationships in response to the queries, at block 326 the process is programmed to generate and execute a build of each derived dataset. A "build" operation, in this context, may mean a software process or thread, which can execute in parallel with many other similar operations, that causes interpreting a set of deletion instructions. A build may comprise re-materializing derived tables. A build, with this approach, avoids potentially creating tables with null values that cannot be resolved after prior deletion of a related row. The build operation reaches a complete state when all relevant records are deleted. For example, based on result messages that identify a derived dataset, the propagated deletion instructions 134 are programmed to form further update queries to API 150 that cause the core RDD processor 160 and worker process 170 to initiate new builds of the derived dataset from the raw dataset from which data has just been deleted. Consequently, upon completion of a build, the new derived dataset omits the data that was just deleted from the raw dataset from which the derived dataset has been built. Therefore, the result of executing such builds is to propagate deletions that occurred in the raw datasets to each derived dataset, automatically under program control, creating derived datasets that also lack the data that was deleted in the raw datasets.

As seen at block 328, these operations are repeated for all derived datasets in the graph. Block 328 may represent programmatic tests to identify the next derived dataset via metadata in the distributed data storage system 180 that represents a graph like that of FIG. 2, or another form of graph. In effect, blocks 326, 328 cause a traversal of such a graph to identify and rebuild, without deleted data, all derived datasets that have relationships to the raw datasets from which data was deleted.

Furthermore, as in the case of deleting data from raw datasets at block 322, processing derived datasets at blocks 324, 326 also may include determining from the provenance metadata that operations outside the database system 180 are required, for example using flat CSV files in a filesystem or HDFS records. In an embodiment, as part of blocks 324, 326, 328, inspection of metadata and relationships of raw or derived datasets may indicate that a particular raw dataset or derived dataset was exported outside the distributed database system 180. For example, a particular dataset may have been transmitted in native format to another instance of the system or exported as a comma-separated value (CSV) file to a host computer, or otherwise transformed into a different format and copied out of the system. When metadata indicates an export, the process of FIG. 3B may be programmed to generate an alert or notification so that an account or user becomes aware that other steps may need to be taken, outside the scope of FIG. 3A, FIG. 3B, to fully delete all copies of relevant data. Or, if the dataset location is in a known external system such as HDFS and login or authentication credentials are available in storage, then a programmatic call or message may be transmitted with those credentials to request the deletion.

In yet another variation, at any of block 322 to block 328 inclusive, the process may be programmed to identify two or more different versions of particular datasets, based upon version identifiers or version metadata in the datasets or in other sources, and to perform similar delete operations on all the versions that are identified. Thus, the process of FIG. 3B may be executed against all several versions of tables or datasets that are identified.

At block 330, the process is programmed to delete any historical builds of the same derived datasets if they exist and any other metadata relating to these that might contain traces of the candidate records. Historical builds consist of derived datasets that are similarly named or tagged, but have a timestamp indicating creation in the past.

Therefore, the embodiment of FIG. 1, when operated in the manner described for FIG. 3A, FIG. 3B with datasets that have any form of raw-derived relationships like those that are shown by example in FIG. 2, provides the technical benefit and improvement of automatically causing assured deletion of all instances of a specified data item or unit, in a distributed database system in which copies of the data item or unit may be represented across multiple raw and derived datasets as well as historical builds of the derived datasets. An application instance 132, external computer 138, or other source may specify data to be deleted and achieve the assured removal of all relevant data records from raw datasets, derived datasets downstream, and historical builds of those derived datasets, even in a distributed database system with the property of immutability.

Embodiments may be used effectively and efficiently in relational database systems that feature tables and materialized views of the tables, as well as raw datasets and derived datasets as described herein, with or without systems of record such as POSTGRES.

Various embodiments may implement log or notification recording functions to create metadata specifying which account, computer or user requested, created, approved, or executed a deletion request or deletion operation. For example, in FIG. 3A at block 312, 314 the process may be programmed to create and store log file records, or transmit notification messages, specifying which user, account or computer performed, requested, or executed the associated operation. Similar log records or notifications may be created or transmitted after block 330 when a set of deletion operations completes. Log records or notifications may include, in an embodiment, identification of who requested or performed an operation, who approved an operation, the number of rows involved in an operation, hash values of what was detected to delete, versions, rematerialize identifications and other metadata values. In this manner a complete audit trail of deletion operations may be maintained, which may have operational, legal, or other benefits.

Implementation Example—Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Implementation Example—Basic Software System

Figure 5:
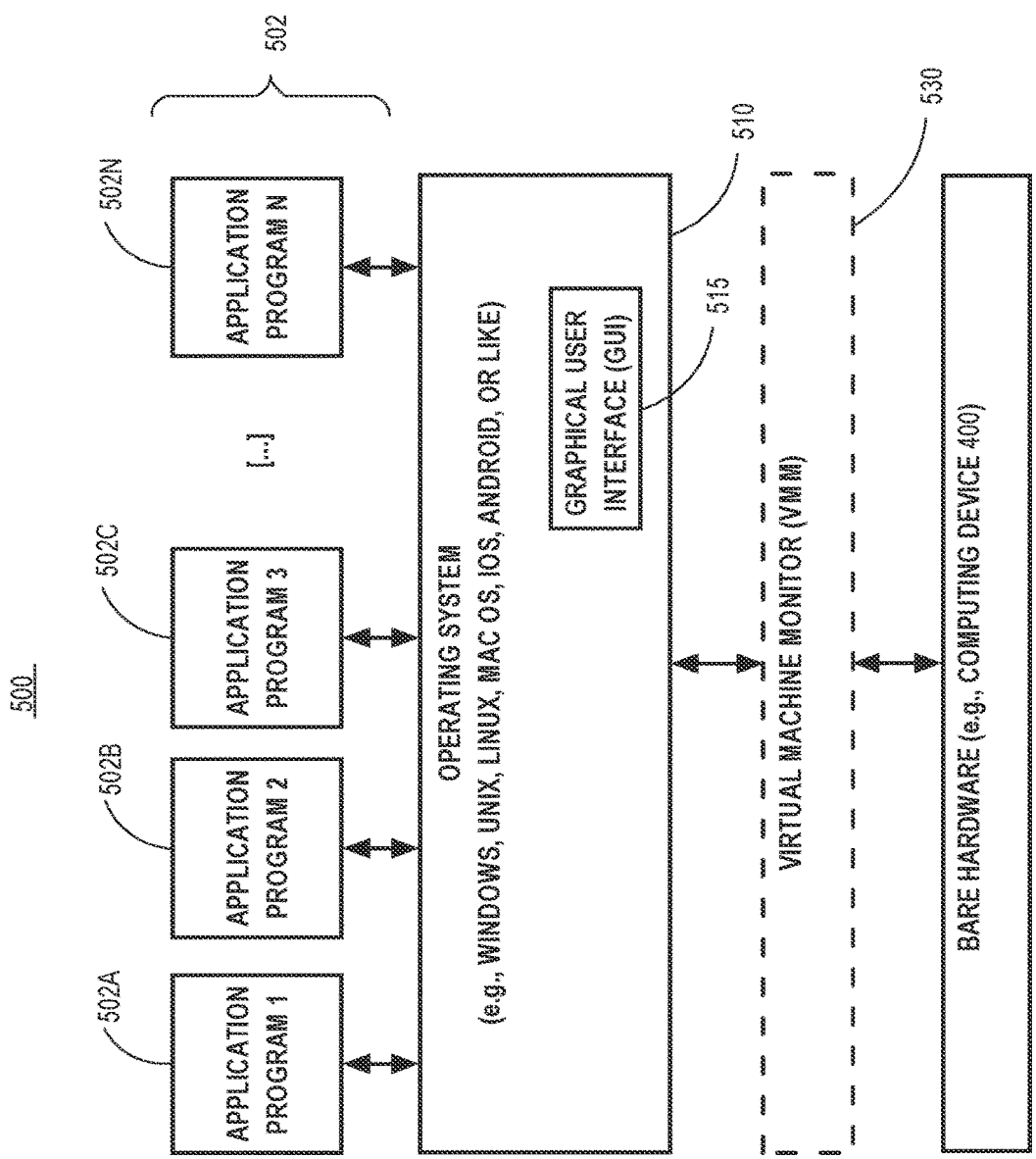
FIG. 5 is a block diagram of a basic software system that may be employed for controlling the operation of a computing device.

FIG. 5 is a block diagram of a basic software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

The invention claimed is:

1. A method of enabling propagated deletion in a distributed database system, comprising:
  causing a display of a relevant dataset and a switch between applying propagated deletion or not,
  applying propagated deletion comprising deleting versions of a record and versions of a different record derived from the record;
  receiving a first selection of a subset of records from the relevant dataset using one or more filter functions and a second selection of applying propagated deletion of the subset of records using the switch, applying propagated deletion further comprising updating the relevant dataset and generating a new dataset from the relevant dataset.

2. The method of claim 1, the applying comprising:

locating, based on metadata in the distributed database system, the subset of records in one or more raw datasets;

deleting the subset of records from the one or more raw datasets.

3. The method of claim 2, the applying further comprising:

identifying, based on the metadata in the distributed database system, one or more derived datasets linked to the one or more raw datasets;

executing, in response to the deleting, one or more builds of the one or more derived datasets to obtain the new dataset.

4. The method of claim 3, the identifying comprising loading successive derived datasets based on name or timestamp values until a relationship to a raw dataset of the one or more raw datasets is found.

5. The method of claim 3, the executing comprising rematerializing derived tables.

6. The method of claim 3, further comprising:

determining, based on the metadata in the distributed database system, that a derived dataset of the one or more derived datasets has been exported to a remote computer;

generating an alert of a potential need to access the remote computer.

7. The method of claim 3, the applying further comprising deleting historical derived datasets corresponding to the one or more builds.

8. The method of claim 1, further comprising, in response to receiving the second selection of applying propagated deletion, adding the subset of records to a deletion list as a queue.

9. The method of claim 1, further comprising:

submitting the subset of records to a remote computer for approval;

receiving a response indicating an approval of applying propagated deletion to the subset of records.

10. The method of claim 1, further comprising:

applying the one or more filter functions again to the relevant dataset;

verifying that the applying results in an empty set.

11. A system for enabling propagated deletion in a distributed database system, comprising:

a memory;

one or more processors coupled to the memory and configured to perform:

causing a display of a relevant dataset and a switch between applying propagated deletion or not, applying propagated deletion comprising deleting versions of a record and versions of a different record derived from the record;

receiving a first selection of a subset of records from the relevant dataset using one or more filter functions and a second selection of applying propagated deletion of the subset of records using the switch, applying propagated deletion further comprising updating the relevant dataset and generating a new dataset from the relevant dataset.

12. The system of claim 11, the applying comprising:

locating, based on metadata in the distributed database system, the subset of records in one or more raw datasets;

deleting the subset of records from the one or more raw datasets.

13. The system of claim 12, the applying further comprising:

identifying, based on the metadata in the distributed database system, one or more derived datasets linked to the one or more raw datasets;

executing, in response to the deleting, one or more builds of the one or more derived datasets to obtain the new dataset.

14. The system of claim 13, the identifying comprising loading successive derived datasets based on name or timestamp values until a relationship to a raw dataset of the one or more raw datasets is found.

15. The system of claim 13, the executing comprising rematerializing derived tables.

16. The system of claim 13, the one or more processors further configured to perform:

determining, based on the metadata in the distributed database system, that a derived dataset of the one or more derived datasets has been exported to a remote computer;

generating an alert of a potential need to access the remote computer.

17. The system of claim 13, the applying further comprising deleting historical derived datasets corresponding to the one or more builds.

18. The system of claim 11, the one or more processors further configured to perform, in response to receiving the second selection of applying propagated deletion, adding the subset of records to a deletion list as a queue.

19. The system of claim 11, the one or more processors further configured to perform:

submitting the subset of records to a remote computer for approval;

receiving a response indicating an approval of applying propagated deletion to the subset of records.

20. The system of claim 11, the one or more processors further configured to perform:

applying the one or more filter functions again to the relevant dataset;

verifying that the applying results in an empty set.

* * * * *